(12) United States Patent
Kuehnle et al.

(10) Patent No.: US 8,672,108 B2
(45) Date of Patent: Mar. 18, 2014

(54) DRIVE TRAIN, IN PARTICULAR A HYBRID DRIVE TRAIN

(75) Inventors: Michael Kuehnle, Buehl (DE);
Thorsten Krause, Buehl (DE);
Dominique Engelmann, Offendorf (FR); Parviz Movlazada, Rastatt (DE);
Benjamin Voegtle, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 675 days.

(21) Appl. No.: 12/837,028

(22) Filed: Jul. 15, 2010

(65) Prior Publication Data
US 2011/0011692 A1 Jan. 20, 2011

(30) Foreign Application Priority Data

Jul. 16, 2009 (DE) .......................... 10 2009 033 849

(51) Int. Cl.
*F16D 37/00* (2006.01)

(52) U.S. Cl.
USPC ........................................................ 192/3.33

(58) Field of Classification Search
USPC ................... 192/3.29, 3.3, 3.26, 85.25, 105 F
See application file for complete search history.

(56) References Cited

U.S. PATENT DOCUMENTS

| 3,255,642 | A | * | 6/1966 | Christenson et al. | ........... 477/59 |
| 5,950,787 | A | * | 9/1999 | Murasugi et al. | ........... 192/85.25 |
| 5,964,329 | A | * | 10/1999 | Kawaguchi et al. | ........... 192/3.3 |
| 8,322,504 | B2 | * | 12/2012 | Mueller et al. | ........... 192/85.25 |
| 2008/0257674 | A1 | * | 10/2008 | Sasse et al. | ................. 192/3.29 |
| 2008/0257675 | A1 | * | 10/2008 | Sasse et al. | ................. 192/3.29 |
| 2009/0145712 | A1 | * | 6/2009 | Daniel et al. | ................. 192/3.29 |

FOREIGN PATENT DOCUMENTS

DE 102007039854 5/2008

* cited by examiner

*Primary Examiner* — David D Le
*Assistant Examiner* — David J Hlavka
(74) *Attorney, Agent, or Firm* — Simpson & Simpson, PLLC

(57) ABSTRACT

A drive train, in particular, a hybrid drive train with a torque converter, which can be operatively connected with a drive through a clutch. The clutch includes an emergency operation actuation device with at least one emergency operation actuation element, which defines a centrifugal oil cavity which includes oil and which is coupled with the drive.

2 Claims, 7 Drawing Sheets

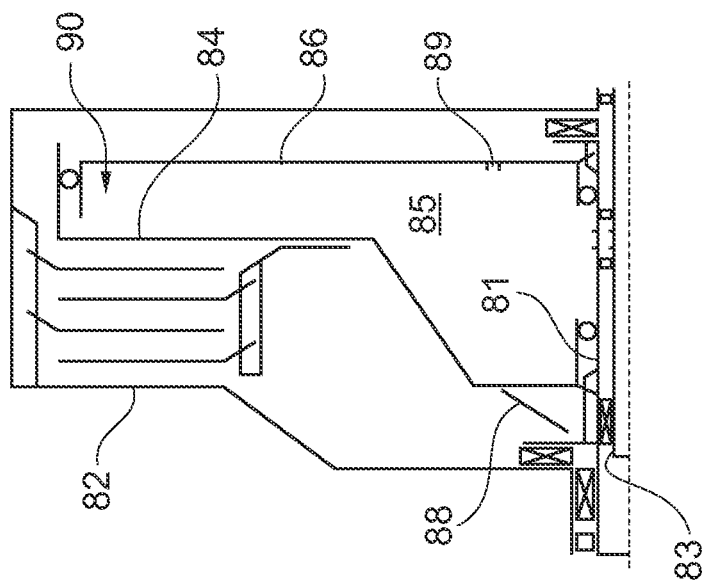
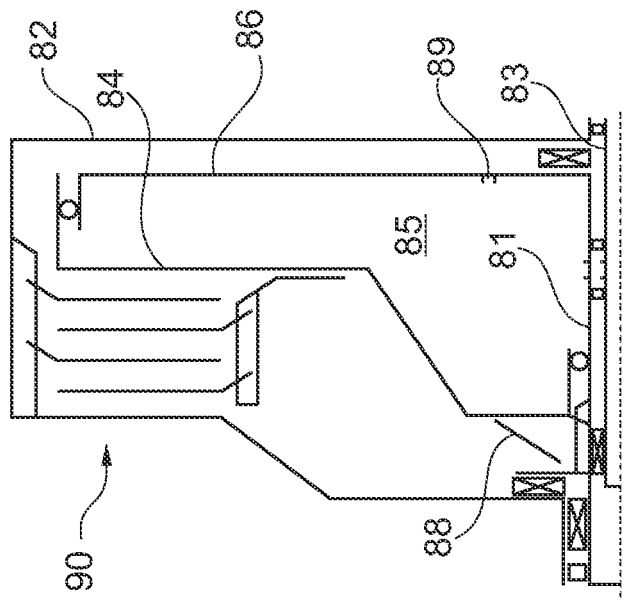

DRIVE TRAIN, IN PARTICULAR A HYBRID DRIVE TRAIN

CROSS-REFERENCE TO RELATED APPLICATIONS

This application claims priority from German Patent Application No. 10 2009 033 849.7, filed Jul. 16, 2009, which application is incorporated herein by reference in its entirety.

FIELD OF THE INVENTION

The invention relates to a drive train, in particular a hybrid drive train with a transmission or a torque converter, which can be operatively connected with a drive unit through a clutch.

BACKGROUND OF THE INVENTION

From the German publication document DE 10 2007 039 854 A1 a drive train is known for a motor vehicle with an internal combustion piston engine and an electric motor, wherein the internal combustion piston engine can be brought into operative engagement with an input shaft of a transmission through a first clutch and the electric motor can be brought into operative engagement with the input shaft of the transmission through a second clutch.

It is an object of the invention to facilitate emergency operations in a drive train in a simple manner.

BRIEF SUMMARY OF THE INVENTION

The object is accomplished in a drive train, in particular a hybrid drive train, with a transmission or a torque converter which can be operatively connected to a drive through a clutch in that the clutch includes an emergency operation actuation device with at least one emergency operation actuation element which defines a centrifugal oil cavity which includes oil and which is coupled with the drive. The clutch, which is connected between the drive and the transmission or the torque converter, is also designated as a pump clutch. The clutch has to be configured to be opened substantially without drag torque in an electric operating mode of a motor vehicle configured with a drive train according to the invention. For emergency operations, it is necessary to transfer the highest possible torque through the clutch in order to be able to drive the transmission and a transmission oil pump. For this purpose e.g., an additional two-sided wet clutch can be used; however, the clutch requires a lot of space. In the drive train according to the invention, the clutch can be actuated during emergency operations by the drive through the emergency operation actuation element and the centrifugal oil. Torque transfer can also be performed through the emergency operation actuation device when the clutch cannot be actively controlled during emergency operations. The emergency operation actuation element is moved into an axial effective position through the centrifugal oil pressure resulting from various speeds of rotation in order to close the clutch. The terms axial and radial used in the context of the present invention relate to the axis of rotation of the clutch. Axial means in a direction of the axis of rotation of the clutch or parallel to the axis of rotation of the clutch. Radial means transverse to the axis of rotation of the clutch.

A preferred embodiment of the drive train is characterized in that the emergency operation actuation device includes an emergency operation piston which defines the centrifugal oil cavity and which is moveable in an axial direction for actuating the clutch during emergency operations. The emergency operation piston is disposed between two components according to an essential feature of the invention, wherein the two components rotate at different speeds of rotation during emergency operations. The emergency operation piston is then moved into its effective position through the centrifugal oil pressure resulting from various speeds of rotation.

Another preferred embodiment of the drive train is characterized in that the centrifugal force oil cavity is defined by an inner disc support of the clutch. The centrifugal oil cavity is preferably disposed at least partially radially within discs of the clutch, which is preferably configured as a disc clutch. This has the advantage that no additional installation space is required for the centrifugal oil cavity.

Another preferred embodiment is characterized in that the emergency operation piston is radially supported in the inner disc support, so that the emergency operation piston is moveable in an axial direction in order to actuate the clutch during emergency operations. In order to be able to use the inner cavity of the inner disc support as a seal and/or support surface it can be required to machine it on the inside, in particular to lathe it. Alternatively, a sleeve can be inserted into the inner disc support.

Another preferred embodiment of the drive train is characterized in that the emergency operation piston is disposed in an axial direction between a radial section of the inner disc support and a radial section of a converter cover of the torque converter. The radial section of the inner disc support is coupled with the input of the drive train and the radial section of the converter cover is coupled with the output of the drive train. Thus, the centrifugal oil disposed in the centrifugal oil cavity between the emergency operation piston and the inner disc support is being moved at the speed of rotation of the input during emergency operations. The oil disposed between the emergency operation piston and the converter cover is moved at a lower speed of rotation. These different speeds of rotation cause the emergency operation piston to move in an axial direction away from the radial section of the inner disc support and toward the converter cover to close the clutch.

Another preferred embodiment of the drive train is characterized in that the emergency operation piston loads a disc of the clutch in an axial direction on the side of the emergency operation piston oriented away from the centrifugal oil cavity. The emergency operation piston can load, e.g., the first disc, which extends through the inner disc support in radially inward direction into the centrifugal oil cavity.

Another preferred embodiment of the drive train is characterized in that the emergency operation piston loads a disc of the clutch in an axial direction through a coupling element on the side of the emergency operation piston facing away from the centrifugal oil cavity. A rear disc can be actuated during emergency operations through the coupling element, in order to bring plural discs into frictional engagements with one another, when the clutch is being closed through the emergency operation piston.

Another preferred embodiment of the drive train is characterized in that the coupling element reaches through the inner disc support in a radial direction. For this purpose, the inner disc support has to have a respective passage, which facilitates a movement of the coupling element in an axial direction.

Another preferred embodiment of the drive train is characterized in that the coupling element partially reaches around the inner disc support. The coupling element is configured to be coupled in this embodiment with the rear most disc through a teething of the inner disc support, this means the coupling element is configured to be coupled with the disc farthest away from the converter cover. Thus, all discs in the clutch are configured to be brought into frictional engagement with one another when the clutch is being closed during emergency operations.

Another preferred embodiment of the drive train is characterized in that the clutch is configured as a wet operating disc clutch with a piston, through which the clutch is actuatable through pressure loading. During normal operations, the disc clutch is actuatable in a known manner through pressure loaded oil, which is provided by a respective oil pump and fed into a pressure cavity, which is defined by the piston.

Another preferred embodiment of the drive train is characterized in that the piston defines the centrifugal oil cavity of the emergency operation actuation device and the piston is coupled with a clutch hub non-rotatably, but moveable in an axial direction. Thus, it is ensured that the piston rotates with drive speed.

Another preferred embodiment of the drive train is characterized in that the centrifugal oil cavity is defined by a centrifugal oil cavity defining wall, relative to which the piston is moveable in an axial direction. The centrifugal oil cavity defining wall is preferably coupled with the clutch hub as well.

Another preferred embodiment of the drive train is characterized in that the centrifugal oil cavity defining wall extends from the clutch hub. Thus, it is ensured that the centrifugal oil cavity-defining wall rotates with drive speed as well.

Another preferred embodiment of the drive train is characterized in that the centrifugal oil cavity defining wall is coupled non-rotatably, but moveable in an axial direction, with the clutch hub. Thus, it is ensured that the centrifugal oil cavity defining wall rotates with drive speed.

Another preferred embodiment of the drive train is characterized in that the centrifugal oil cavity defining wall comprises at least one oil passage. The oil passage is also designated as an oil nozzle. Through the oil nozzle, the centrifugal oil cavity can be actively used for the clutch control.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIGS. 6 through 9 illustrate schematic depictions of additional embodiments in semi-sectional views with the symbols of FIG. 5; and, FIG. 10 illustrates a drive train according to another embodiment in a semi-sectional view.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
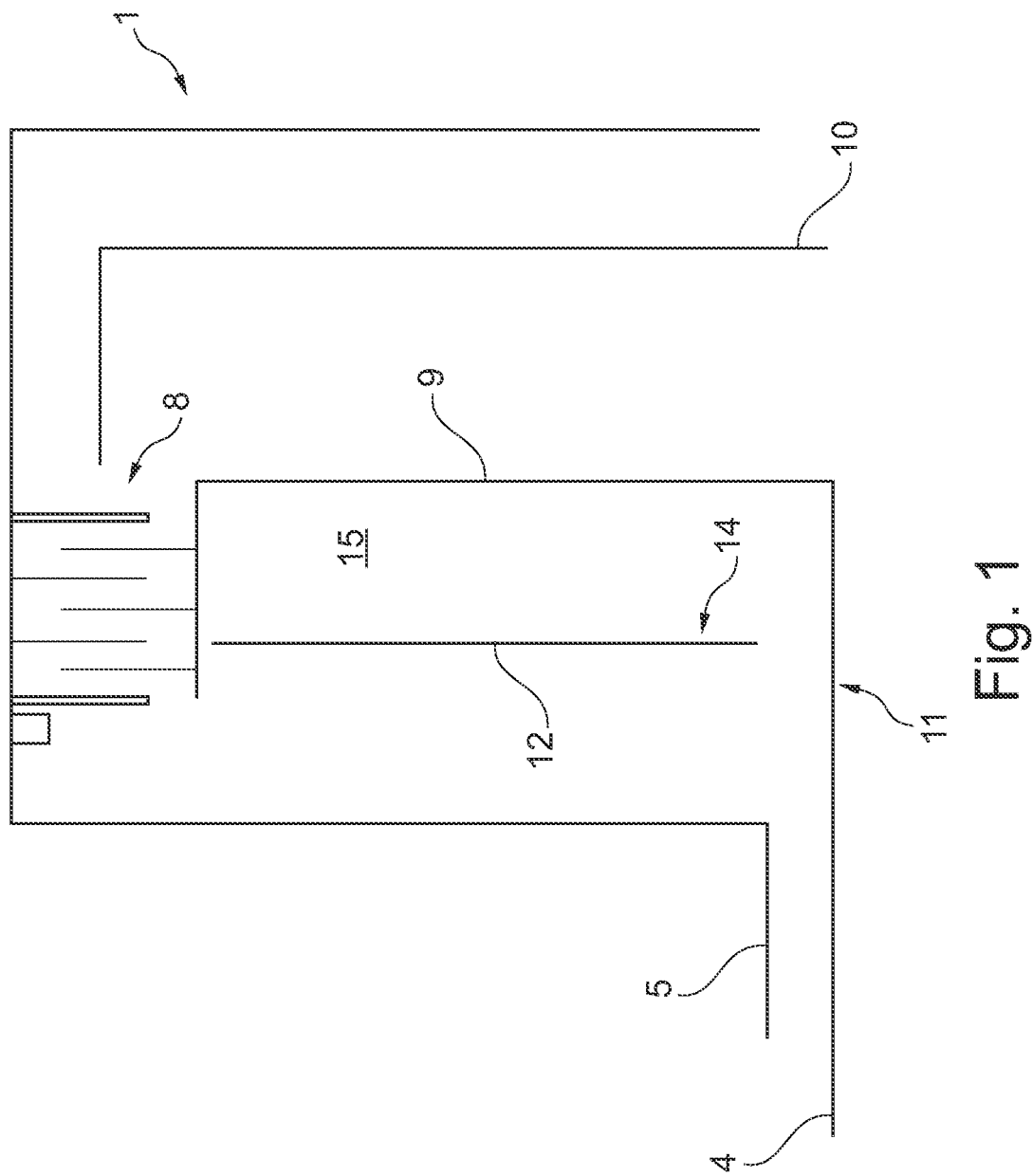
FIG. 1 illustrates a schematic depiction of a drive train according to a first embodiment.

FIG. 1 illustrates a drive train of a motor vehicle with input 4 and output 5 in a highly simplified schematic. Drive train 1 is preferably a hybrid drive train with a primary drive; in particular, an internal combustion engine, and a secondary drive; in particular an electric motor. Input 4 is configured to be coupled to output 5 through clutch 8. Clutch 8 is preferably configured as a wet operating disc clutch. According to an essential feature of the invention, the relative speeds of rotation, at which various components of the clutch rotate, are used for actuating passive disc clutch 8.

Clutch 8 includes inner disc support 9, at which the inner discs are mounted, which are configured to be brought into frictional engagement with the outer discs, which are connected non-rotatably to output 5. Clutch 8 is actuatable through piston 10 during normal operations.

When the internal combustion engine runs and electric motor operation is not possible, it can be necessary for emergency operation of hybrid drive train 1, to also facilitate torque transmission when clutch 8 cannot be actively controlled through the piston. For this purpose emergency operation actuation device 11 with emergency operation piston 12 are integrated into clutch 8 according to an essential feature of the invention.

Emergency operation piston 12 operates as emergency operation actuation element 14 and radially defines centrifugal oil cavity 15 within inner disc support 9. When the internal combustion engine runs, but no electric propulsion is possible, then inner disc support 9, emergency operation piston 12 and the oil disposed in centrifugal oil cavity 15 rotate at the input speed of input 4. Output 5 stands still or rotates at a lower rotational speed than input 4.

Oil is also disposed in the intermediary cavity between emergency operation piston 12 and output 5 as well, but the oil rotates at a lower rotational speed than the oil in centrifugal oil cavity 15. Due to the different rotational speeds of the components, between which emergency operation piston 12 is connected, and the dynamic pressures resulting therefrom, which are also designated as centrifugal oil pressures, a movement of emergency operation piston 12 is generated in an axial direction away from inner disc support 9 and towards output 5. Thus, a resulting force is imparted upon emergency operation piston 12, wherein the force is oriented to the left in FIG. 1.

In order to use the internal space of inner disc support 9 as a sealing surface or a support surface, it is necessary to machine the internal space through turning or to insert a sleeve and secure it. Thus, clutch 8 can be maintained ready for driving during emergency operation solely through the input speed of input 4, in particular the internal combustion engine. Thus safety critical stalls, for example, on a railroad crossing, can be avoided.

Figure 2:
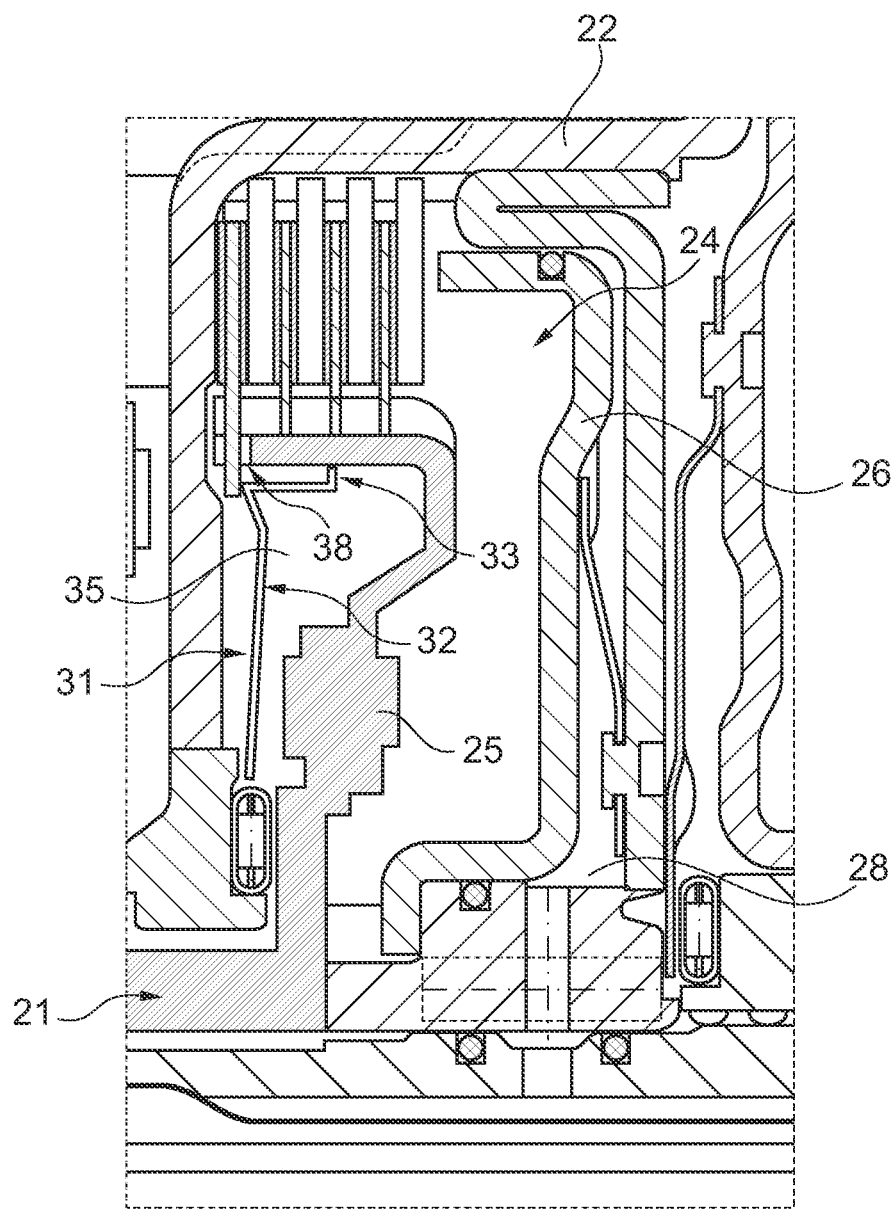
FIG. 2 illustrates a detail of a drive train in a longitudinal sectional view according to a second embodiment.
Figure 3:
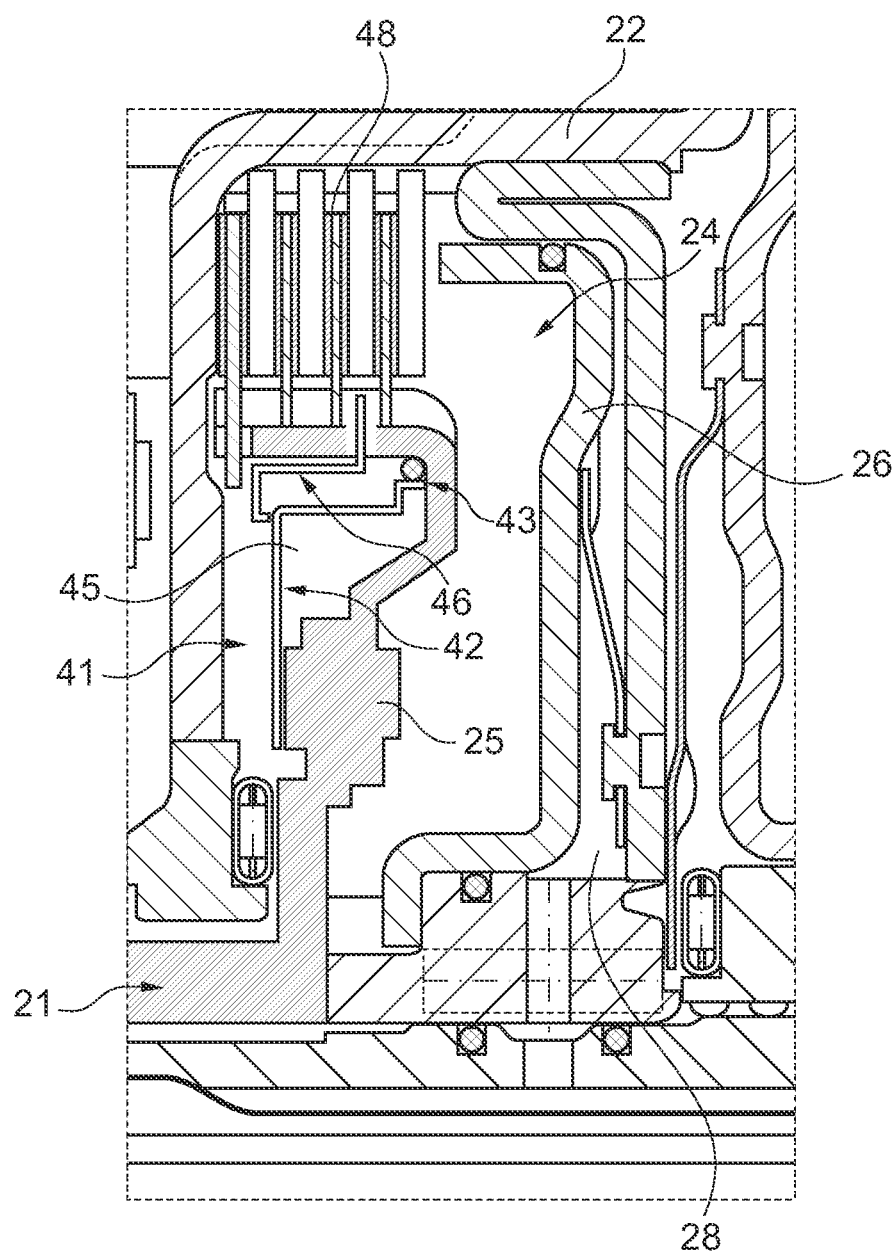
FIG. 3 illustrates the same detail as FIG. 2 according to a third embodiment.
Figure 4:
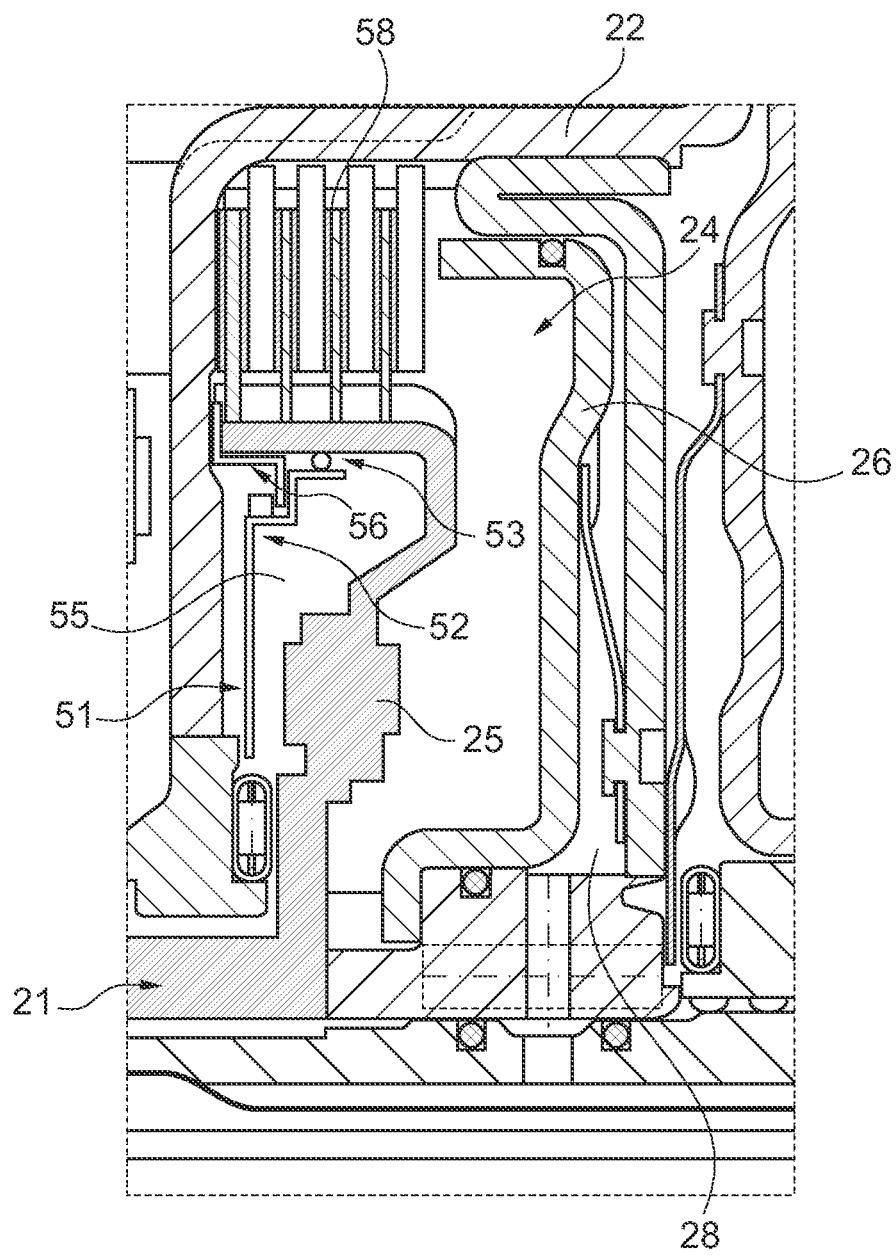
FIG. 4 illustrates the same detail as FIGS. 2 and 3 according to another embodiment.

In FIGS. 2 through 4 three different embodiments are illustrated in a semi-sectional view through a drive train, as it is illustrated in a highly simplified manner in FIG. 1. Input element 21 is connected non-rotatably with an input. Output element 22 is connected non-rotatably with an output. Clutch 24 is connected between input element 21 and output element 22. Clutch 24 is configured as a wet operating disc clutch with inner disc support 25 and actuatable in a normal manner through piston 26. Piston 26 is actuated, e.g., through pressurized oil in pressure cavity 28, which is connected for this purpose to an exit of an oil pump.

In order to be able to facilitate an actuation of the clutch during emergency operations, wherein the internal combustion engine runs, but no electric propulsion is possible, emergency operation actuation device 31 and emergency operation piston 32 are integrated into clutch 24 in FIG. 2. Emergency operation piston 32 is supported in a radial direction within inner disc support 25 with seal 33 connected therebetween, so that the emergency operation piston is moveable in an axial direction. Emergency operation piston 32 defines centrifugal oil cavity 35 in inner disc support 25. Emergency operation piston 32 contacts disc 38 of clutch 24 on the side of the emergency operation piston oriented away from centrifugal oil cavity 35.

During emergency operations, inner disc support 25 rotates at the input speed, which is generated by the internal combustion engine. Since the speed of rotation inside centrifugal oil cavity 35, which is defined by emergency operation piston 32, is greater than the speed of rotation outside of centrifugal oil cavity 35, emergency operation piston 32 is moved through the centrifugal oil pressure to the left side, thus away from inner disc support 25. The movement of emergency operation piston 32 directly impacts first connected disc 38 of clutch 24. Thus, an emergency operation clutch configured as a single surface clutch can be implemented in a simple manner.

FIG. 3 illustrates emergency operation actuation device 41 and emergency operation piston 42, which are integrated into clutch 24. Emergency operation piston 42 is supported in inner disc support 25 moveable in an axial direction with seal 43 connected between the two components. Emergency operation piston 42 defines a centrifugal oil cavity radially within inner disc support 25 and is coupled with rear disc 48 through coupling element 46. Inner disc support 25 rotates during emergency operations with the input speed of rotation of input element 21.

Since the speed of rotation inside centrifugal oil cavity 45 defined by emergency operation piston 42 is greater than outside the centrifugal oil cavity, emergency operation piston 42 is moved to the left through the centrifugal oil pressure; this means it is moved away from inner disc support 25. This movement of emergency operation piston 42 is transmitted to rear disc 48 through coupling element 46 which is configured as an actuation ring and which reaches through inner disc support 25 in a radial direction. Thus, three disc pairs of disc clutch 24 are configured to be brought into frictional engagement through coupling element 46. For this purpose, inner disc support 25 is configured with axially extending slots in the pass-through portions of coupling element 46.

FIG. 4 illustrates emergency operation actuation device 51 and emergency operation piston 52, which are integrated into clutch 24. Emergency operation piston 52 is radially supported within the discs of inner disc support 25 with seal 53 connected therebetween, so that emergency operation piston 52 is moveable in an axial direction.

Emergency operation piston 52 defines centrifugal oil cavity 55 in inner disc support 25 and is coupled to rear most disc 58 of disc clutch 24 through coupling element 56 which reaches about inner disc support 25 in the portion of the discs.

During emergency operations, inner disc support 25 rotates with the drive speed of rotation of drive element 21. Since the speed of rotation inside centrifugal oil cavity 55 defined by emergency operation piston 52 is greater than the speed of rotation outside centrifugal oil cavity 55, emergency operation piston 52 together with coupling element 56 is moved to the left and the movement is transmitted to rear most disc 58 through coupling element 56. Thus, all discs of disc clutch 24 can also be brought into frictional engagement with one another during normal operations.

Figure 5:
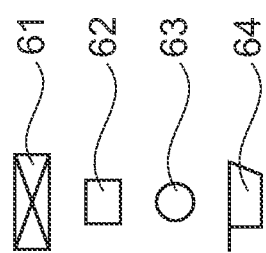
FIG. 5 illustrates four symbols, which are used in FIGS. 6 through 9.

FIG. 5 illustrates symbols 61 through 64, which are being used in FIGS. 6 through 9. Symbol 61 represents a bearing. Symbol 62 represents a radial seal. Symbol 63 illustrates an O-Ring. Symbol 64 represents a teething.

FIGS. 6 through 9 each illustrate a drive train, in particular a hybrid drive train of a motor vehicle with input element 81 and output element 82 in a highly simplified manner. Output element 82 is configured to be coupled with transmission input shaft 83. A clutch is connected between input element 81 and output element 82, wherein the clutch is configured as a wet operating disc clutch that is configured to be actuated through piston 84. Piston 84 defines a side of centrifugal oil cavity 85 in an axial direction, wherein the other side is defined by a centrifugal oil cavity defining wall 86. Piston 84 is preloaded towards centrifugal oil cavity 85 through spring 88. At least one oil passage 89 is provided in the centrifugal oil cavity defining wall 86, wherein the oil passage acts as an oil nozzle.

Figure 7:
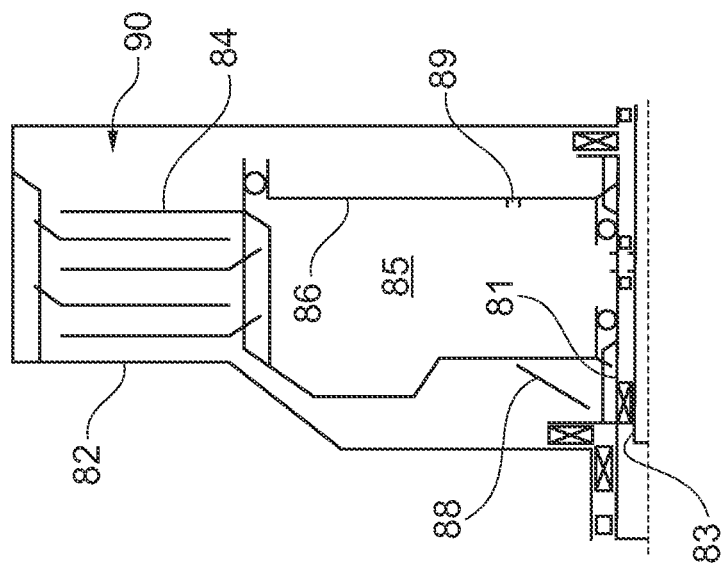
Figure 6:
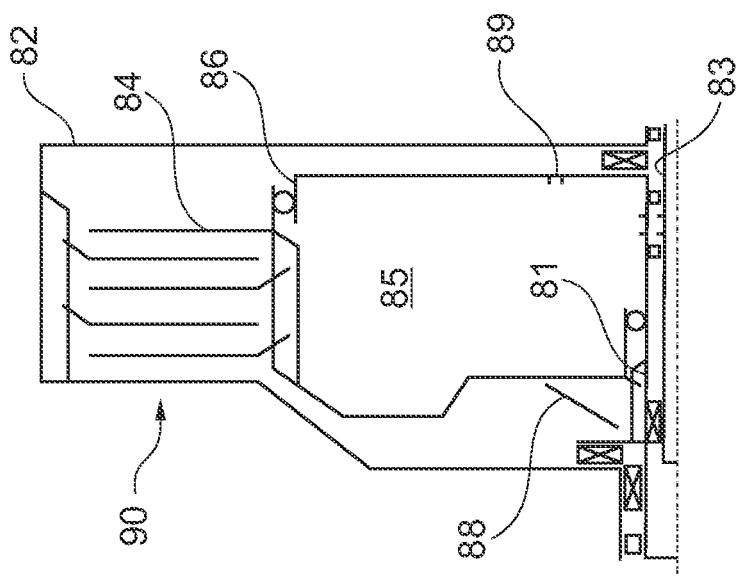

In the embodiments illustrated in FIGS. 6 and 7, centrifugal oil cavity 85 is disposed radially inside the discs of clutch 90. In the embodiments illustrated in FIGS. 8 and 9, centrifugal oil cavity 85 is only partially disposed radially inside the discs of clutch 90. In this embodiment, centrifugal oil cavity 85 extends radially further outward into the portion of the discs of clutch 90.

Preferably, input element 81 is configured as a clutch hub, which is attached non-rotatably to the drive. In the embodiments illustrated in FIGS. 6 through 9, piston 84, as well as the centrifugal oil cavity defining wall 86, is attached to the input element non-rotatably. Through oil nozzles 89, centrifugal oil cavity 85 is configured to be actively used for clutch actuation through an oil flow. Output element 82 is preferably permanently connected with an electric motor of a hybrid drive train.

The embodiments illustrated in FIGS. 6 and 7 have the advantage that no additional installation space is required for centrifugal oil cavity 85. Due to the larger centrifugal oil cavity 85, the embodiments illustrated in FIGS. 8 and 9 have the advantage that the centrifugal force effect is maximized.

The embodiments represented in FIGS. 6 through 9 operate in the following manner. During emergency operation, when the electric motor stands still and the internal combustion engine rotates, clutch components 84, 86 and 81 that rotate with the internal combustion engine generate a centrifugal oil pressure in centrifugal oil cavity 85. Piston 84 and centrifugal oil cavity defining wall 86 are pressed apart through the centrifugal oil pressure, which means the clutch, also designated as a pump clutch closes or is rather being closed. Due to the closed friction liners, the oil flow through oil nozzles 89 is interrupted. Through the clutch torque produced by the centrifugal oil pressure, the oil pump disposed behind clutch 90 in the force flow is can be operated and the system can be actively filled. Thus, clutch 90 can be loaded by the closing pressure again in a controlled manner, and emergency operations are terminated.

During an electric motor operation, when the internal combustion engine stands still and the electric motor rotates, two clutch components 84 and 86 which define centrifugal oil cavity 85 are pushed together under the effect of the dynamic pressure between output element 82 and clutch components 84 and 86. This means the pump clutch opens and the drag torque is minimized; thus, spring 88 provides additional assistance.

Figure 10:
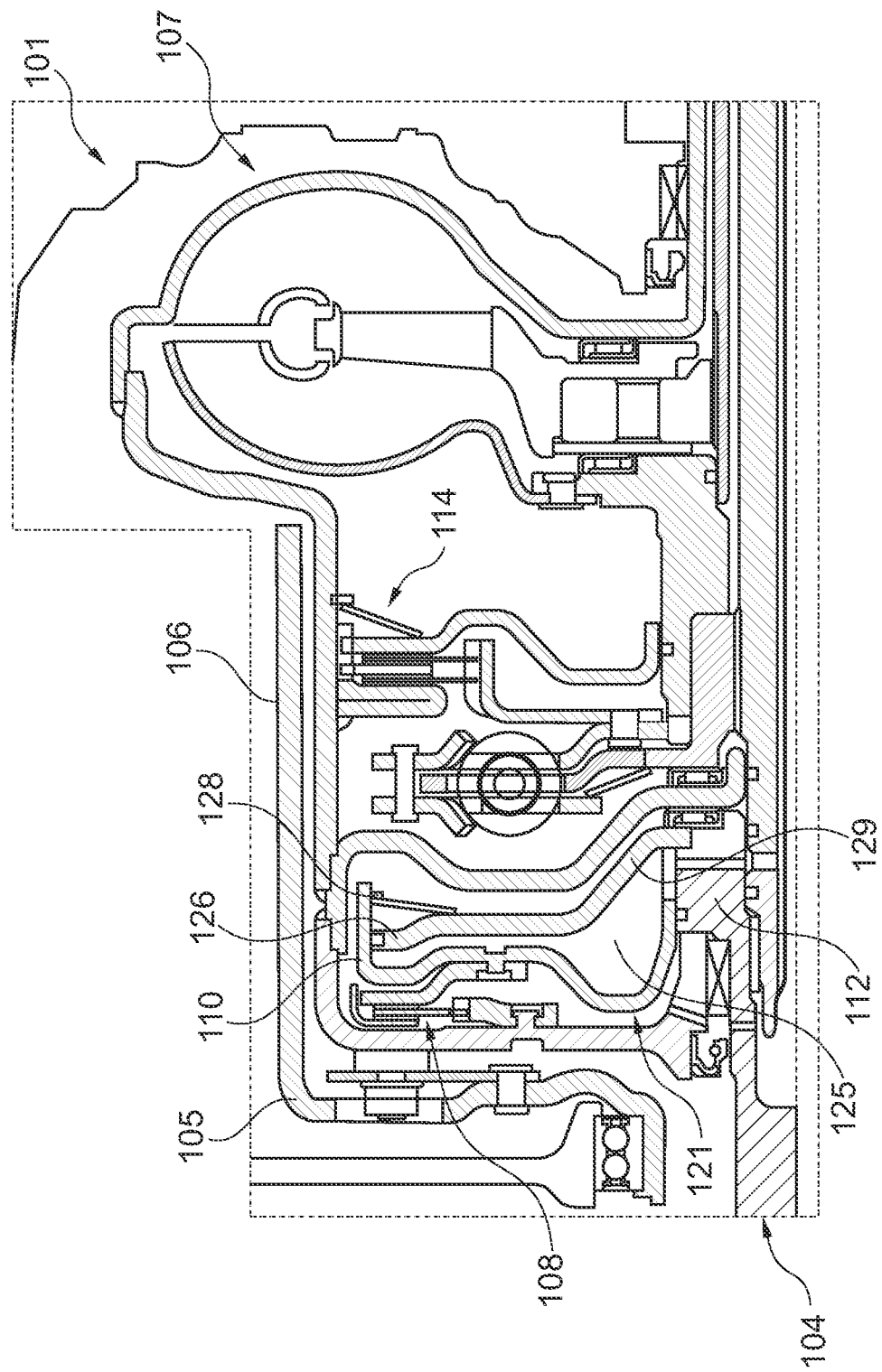

In FIG. 10 drive train 101, in particular a hybrid drive train according to an additional embodiment, is illustrated in a semi-sectional view. Drive train 101 includes input 104 and output 105. Input 104 is preferably an internal combustion engine. Output 105 is connected non-rotatably to support 106 for a rotor of an electric motor. Furthermore, output 105 is connected non-rotatably to a converter cover of torque converter 107. Output 105 is configured to be connected non-rotatably with a transmission input shaft or one of plural transmission input shafts through torque converter 107 or through clutch 114. Output 105 is configured to be operatively connected non-rotatably with input 104 through additional clutch 108.

Clutch 108 is configured as a wet operating clutch with disc construction and configured to be actuated through piston 110. Piston 110 is movably supported in an axial direction relative to clutch hub 112. Clutch hub 112 is connected non-rotatably or permanently connected with input 104. The actuation through piston 110 in normal operation of the hybrid drive train is performed through pressure loading through an oil pump. During emergency operations, the actuation of clutch 108 is performed through emergency operation actuation device 121, which includes centrifugal oil cavity 125.

Centrifugal oil cavity 125 is defined by piston 110 and centrifugal oil cavity defining wall 126, which is permanently connected with clutch hub 112 and extends radially outwardly from the clutch hub. Piston 110 is retained at centrifugal oil cavity defining wall 126 through spring 128, so that piston 110 is moveable in a direction away from centrifugal oil cavity defining wall 126 only against the spring force of spring 128. Centrifugal oil cavity defining wall 126 includes at least one oil passage 129, which forms an oil nozzle. The gap enclosed between the piston and centrifugal oil cavity defining wall 126 functions as centrifugal oil cavity 125.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

Reference Numerals And Designations

1 Drive Train
2 Input, Drive
5 Output
8 Clutch
9 Inner disc support
10 Piston
11 Emergency operation actuation device
12 Emergency operation piston
14 Emergency operation actuation element
15 Centrifugal oil cavity
21 Input element
22 Output element
24 Clutch
25 Inner disc support
26 Piston
28 Pressure cavity
31 Emergency operation actuation device
32 Emergency operation piston
33 Seal
35 Centrifugal oil cavity
38 Disc
41 Emergency operation actuation device
42 Emergency operation piston
43 Seal
45 Centrifugal oil cavity
46 Coupling element
48 Disc
51 Emergency operation actuation device
52 Emergency operation piston
53 Seal
55 Centrifugal oil cavity
56 Coupling element
58 Disc
61 Support
62 Radial seal ring
63 O-Ring
64 Teething
81 Input element
82 Output element
83 Transmission input shaft
84 Piston
85 Centrifugal oil cavity
86 Centrifugal oil cavity defining wall
88 Spring
89 Oil passage
90 Clutch
101 Drive train
104 Input
105 Output
106 Support
107 Torque converter
108 Clutch
110 Piston
112 Clutch hub
114 Clutch
121 Emergency operation actuation device
125 Centrifugal oil cavity
126 Centrifugal oil cavity defining wall
128 Spring
129 Oil passage

What is claimed is:

1. A drive train comprising:
a torque converter, which is operatively connected with an input through a clutch, wherein the clutch comprises an emergency operation actuation device with at least one emergency operation actuation element, which defines a centrifugal oil cavity, which comprises oil and is coupled with the input, wherein:
the clutch is configured as a wet operating disc clutch with a piston;
the clutch is actuatable by the piston through pressure loading;

the piston defines the centrifugal oil cavity of the emergency operation actuation device and the piston is coupled non-rotatably, but axially movable, with a clutch hub;

the centrifugal oil cavity is defined by a centrifugal oil cavity defining wall and the piston is moveable in an axial direction relative to the centrifugal oil cavity defining wall; and, the centrifugal oil cavity defining wall is coupled non-rotatably but axially movable with the clutch hub.

2. A drive train comprising:

an input;

a torque converter: and, a clutch including:

- a first disc support non-rotatably connected to the torque converter;
- a second disc support non-rotatably connected to the input;
- a plurality of discs non-rotatably connected to the inner or the outer disc support;
- a first piston arranged to close the clutch to non-rotatably connect the first and second disc supports; and,
- an emergency operation piston, separate from the first piston and arranged to displace at least a portion of the discs in the plurality of discs to non-rotatably connect the first and second disc supports, wherein:

the input is connected to a primary drive including an internal combustion engine; and, the input is connected to a secondary drive including an electric motor.

* * * * *